Figure 1:
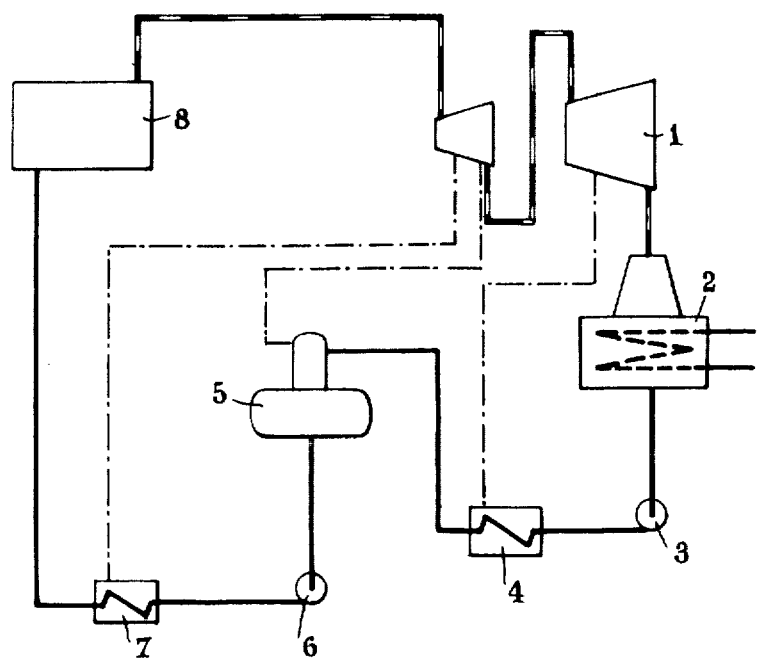

United States Patent [19]
Gardey

[11] 3,892,548
[45] July 1, 1975

[54] APPARATUS FOR DEGASSING A CONDENSER OPERATING IN A THERMAL CYCLE

[75] Inventor: Robert Gardey, Le Bourget, France
[73] Assignee: Compagnie Electro-Mecanique, Paris, France
[22] Filed: May 3, 1974
[21] Appl. No.: 466,827

[30] Foreign Application Priority Data
May 5, 1973 France .............................. 73.16334

[52] U.S. Cl. ......................... 55/194; 55/39; 55/195
[51] Int. Cl. ........................................... B01d 19/00
[58] Field of Search ............... 55/38, 39, 40, 50, 52, 55/55, 192, 193, 194, 195, 198, 199, 200

[56] References Cited
UNITED STATES PATENTS

| | | | |
|---|---|---|---|
| 1,667,850 | 5/1928 | Gibson | 55/50 |
| 1,800,217 | 4/1931 | Jacobus | 55/39 |
| 2,677,433 | 5/1954 | Kretzschmar | 55/39 |
| 3,834,133 | 9/1974 | Bow | 55/39 X |

FOREIGN PATENTS OR APPLICATIONS

| | | | |
|---|---|---|---|
| 756,820 | 9/1956 | United Kingdom | 55/198 |

Primary Examiner—Charles N. Hart
Assistant Examiner—Robert H. Spitzer
Attorney, Agent, or Firm—Pierce, Scheffler & Parker

[57] ABSTRACT

A composite structure operating under a vacuum for condensing steam discharged from a turbine unit of a thermal power plant and de-gassing the condensate prior to feeding it back to the boiler for recycling comprises a condenser casing having an inlet for the steam which passes downwardly over a cooling tube bundle to effect its condensation. The condensate is then passed through a three stage de-gasifier to remove non-condensables such as oxygen. The first stage injects steam issuing from the subsequent stages into and atomizes condensate flowing downwardly on opposite sides of a gabled roof located beneath the tube bundle to accomplish an initial de-gasification; the second stage injects steam into a first tank filled by condensate collected from the roof to accomplish further de-gasification by the bubbling effect produced by the steam injection; and the third stage injects steam into and atomizes a layer of the condensate flowing across a weir from the first tank into a reserve tank to accomplish final de-gasification.

6 Claims, 3 Drawing Figures

APPARATUS FOR DEGASSING A CONDENSER OPERATING IN A THERMAL CYCLE

The present invention relates to an improved arrangement for de-gassing water utilized in a thermal power plant and more particularly to a novel de-gassing structural arrangement combined with the condenser component of the power plant for de-gassing the water immediately following its condensation, the de-gasser structure being located beneath the condenser tube bundle and consisting of three separate de-gasification stages through which the condensed water passes in succession.

It is conventional and necessary to de-gas feed water utilized in a conventional thermal power plant consisting, for example, of a boiler, steam turbine, condenser and feed water pre-heater in order to protect the boiler structure against corrosion by the effects of any oxygen that may be dissolved in the water. The oxygen concentration must be less than 7 p.p.b. at the inlet to the boiler regardless of whether the boiler is fired by coal or oil, or is of the pressurized nuclear type which utilize carbon steel steam generators.

In a conventional thermal power plant facility as illustrated in FIG. 1, the steam leaving the low pressure stage of a two-stage turbine 1 is fed to a condenser 2, and the condensed steam, now re-converted to feed water, is fed by way of an extraction pump 3 through a first pre-heating stage in the form of a heat exchanger 4 operated by steam diverted from the low pressure stage of the turbine, thence through a combined re-heater de-gasifier unit 5 supplied with heating steam from the high pressure stage of the turbine, and thence by way of a pump 6 and a second pre-heating stage in the form of a heat exchanger 7 also operated with steam taken from the high pressure stage of the turbine upstream from the steam take-off point for the re-heater de-gasifier unit 5. After leaving the second pre-heater 7, the feed water enters the boiler 8 and there begins a new cycle of vaporization and passage to the steam turbine.

The re-heater de-gasifier unit 5 operates generally at a pressure of from 1.2 to 15 bars absolute in order to prevent any admission of air from the atmosphere which would undesirably re-gasify the feed water. De-gassing is achieved by various methods such as bubbling with steam, atomization by means of nozzles, flowing the water over plate beds etc., these being used singly or in combination. In the steady state, the feed water enters the de-gasifier with an oxygen concentration that usually will vary between 10 and 200 p.p.b., depending upon the plant load condition and the temperature of the circulating water. This water must leave the de-gasifier at an oxygen content level not exceeding 7 p.p.b.

With respect to power plants of the nuclear type, because of the great size and weight of the supply tanks feeding the de-gasifiers and requiring an installation height of from 15-to 20 meters above the supply pumps, de-gasifiers and tanks simply were eliminated. Under these circumstances, the condenser would have to be supplied with a large water reserve which must leave it de-gasified to an oxygen content level not exceeding 7 p.p.b. because of the use of carbon steel steam generators utilized in thermal power plants of this type.

When the power plant is operating at its rated power output and at a circulating water temperature exceeding 8° to 10°C, the partial pressure of the non-condensable substances in the steam and hence the oxygen in the condenser, will be sufficiently low due to the use of air-extraction equipment, that the requirements relative to oxygen concentration in the water will be met.

When the power plant is operating at a comparatively weak load, e.g. under 50 percent of the normal load carried by the plant, and wherein the temperature of the circulating water is lower than 8°C, (winter) calculated experience has shown that the partial pressure of the non-condensable substance in the steam results in an increase in the oxygen until its concentration in the water reaches a level of 200 p.p.b., an intolerably high level incompatible with satisfactory operation of steam generators.

It is to be observed that some managements of conventional thermal power plants i.e. those operating with coal or oil as fuel demand a guaranteed de-gassing at the condenser as advanced as is the case of a plant of the nuclear type. Such demands are excessive if a re-heater de-gasifier is incorporated in the heating circuit for re-heating the feed water.

The improved de-gassing apparatus in accordance with the present invention meets the following requirements.

1. It has a low bulk factor, a large water reserve being maintained in tank.
2. The condensed water in the condenser must be de-gassed before being introduced into the reserve tank.
3. There will be no cavitation in the extraction pump utilized for drawing the condensed water from the condenser.
4. The condensed and de-gassed water will not be re-gasified.

Figure 3:
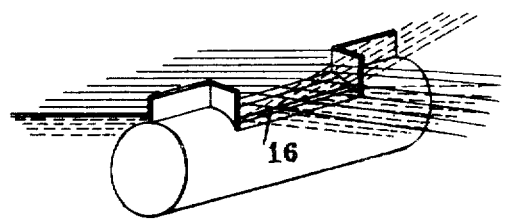
Figure 2:
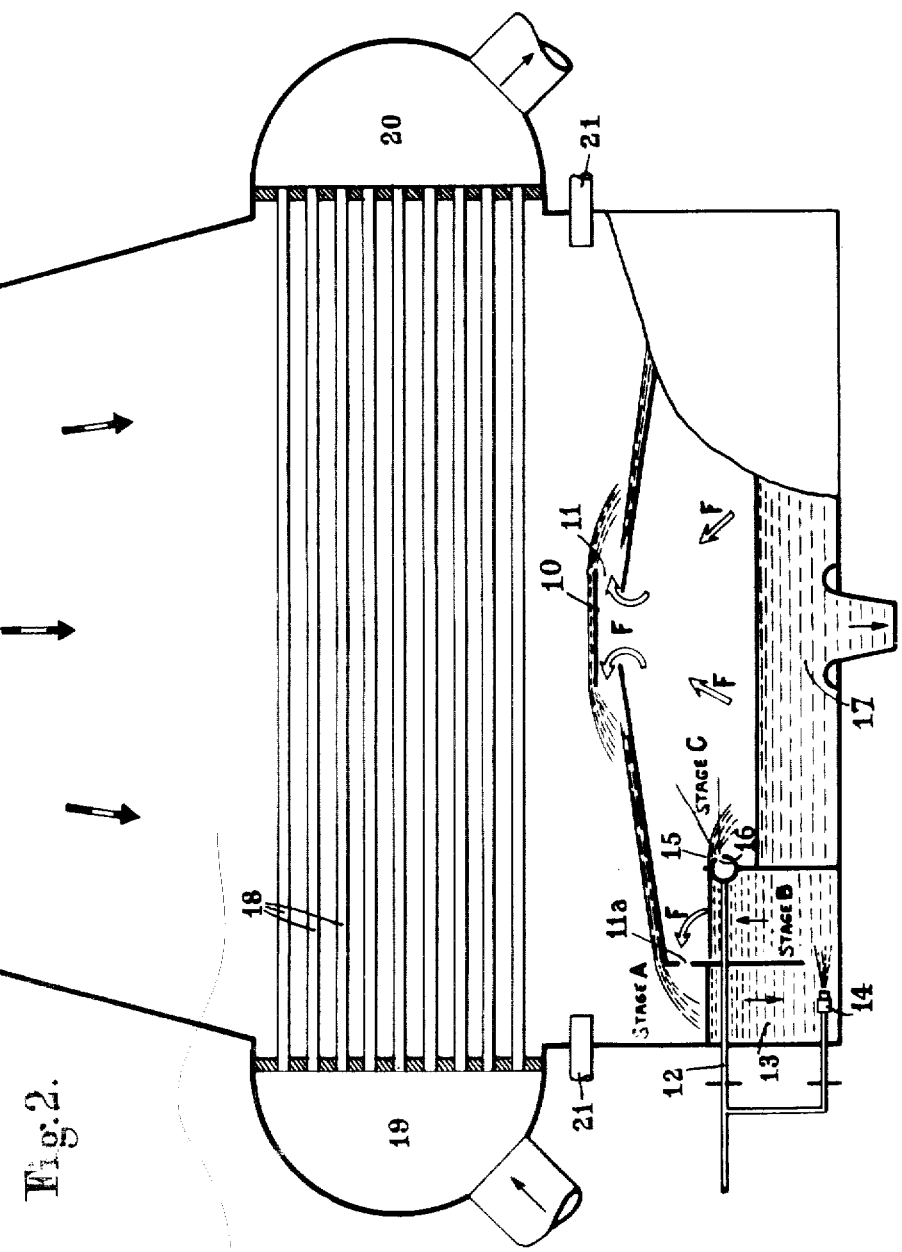

A preferred embodiment of de-gassing apparatus in accordance with the invention will now be described and is illustrated in the accompanying drawings wherein FIG. 1, as already referred to, is a schematic view of the basic components of a thermal power plant and including a re-heater de-gasifier unit in accordance with the prior art, FIG. 2 is a vertical, central section through a structurally combined condenser and de-gasifier structure in accordance with the present invention, and FIG. 3 is a view of a detail drawn in perspective to illustrate one of the de-gassing stages.

With reference now to FIG. 2, it will be seen that the improved de-gasifier structure is incorporated into the structure of the condenser component of the power plant and thus is intended to take place of condenser 2 as illustrated in FIG. 1. Steam discharged from the turbine enters the condenser structure and flows downwardly as indicated by the directional arrows, the steam being passed over the surfaces of, and in heat transfer contact with, the bundle of water-cooled tubes 18. Cooling water enters the tube bundle 18 by way of an inlet header 19 and leaves by way of an outlet header 20. Drains 21 are located along the sides of the condenser casing. The lower portion of the condenser casing, i.e. the part located below the tube bundle 18 accomodates the improved condensate water de-gasifier according to the invention and the interior of the condenser operates under a vacuum. It consists of three stages of which the first effects a coarse, i.e. a slight de-gasification of the condensate by the use of steam which atomizes the condensate as it flows downwardly over the slope of a roof onto which it drops after leaving the horizontally arranged condenser tube bundle 18, the steam being taken from the subsequent two stages; the second stage is constituted by a bubbling device utilizing steam injected into a body of the water collected in a tank from the roof; and the third stage serves to de-gas water received from the second stage by use of the atomization principle and which is produced by means of injecting steam at a high velocity into the water as it flows over a weir from the tank of the second stage into a reserve tank located at the bottom of the condenser casing structure.

In the first stage, denoted on the drawing as "Stage A", steam condensate leaving the condenser tube bundle 18 falls upon a downwardly sloping roof structure 10 and travels along the latter to the opposite sides thereof from which it then passes into a tank structure 13 consisting of two compartments located side-by-side and which are separated from each other by a vertical partition which terminates short of the bottom and thus provides for transfer of the water in the left compartment, as viewed in FIG. 2 to the right compartment. Only the two-compartment tank structure 13 at the left side of the condenser casing is depicted. However, it will be understood that an identical two-compartment tank structure is provided for receiving condensate flowing downwardly across the right half of the gabled roof structure. As the condensate passes across the roof structure it is atomized to a slight degree and thus to a corresponding slight degree is de-gassed by injection of steam issuing from the second and third stages and indicated by arrows F which escapes to the central portion of the roof structure 10 through outlets 11, and also by this same steam which escapes through outlet 11a and is injected into the condensate as it falls off the edge of the roof into tank 13. The primary function of this first stage of de-gasification is to utilize the remainder of the energy contained in the steam as it issues from the second and third stages and which would otherwise be lost; it is the least important of the three stages.

The second stage of the de-gasifier, denoted on the drawing as "Stage B" operates on the bubbling principle, steam being delivered by a conduit 12 and injected through a nozzle 14 into the bottom zone of the two-compartment tank 13. With this arrangement the required dwell time of the water in tank 13 to effect de-gassing is only about 1 minute, as contrasted with a longer time of at least 5 to 6 minutes to assure good de-gassing where the bubbling action is produced by other modes of agitation and which would therefore necessitate a capacity as large as the reserve demanded for the tank thus involving excessive cost and bulk.

As is indicated by the directional arrows, the flow of water in the tank 13 is downwardly through the left compartment thereof, then into and upward through the right compartment and thence over a weir 15 into the reserve tank 17.

The third stage of the de-gasifier, denoted on the drawing as "Stage C" takes place at the weir 15 from which water spills into the reserve tank 17. Here, de-gasification of the water takes place by the atomization principle, steam taken from the supply conduit 12 being ejected at high speed into and thus atomizing the layer of water flowing over the weir 15 from an arrangement of one or more calibrated slit structures 16 located beneath it. The injected steam divides the water into fine droplets that move closely along with the steam proper to thus eliminate substantially all of the oxygen remaining in the water along this path. The weir and steam ejection slit structure 16 associated with it are illustrated in FIG. 3.

The roof 10 extends across and forms an enclosure for the reserve tank 17 from which the de-gasified water is withdrawn for delivery back to the boiler for conversion to steam and re-cycling through the turbine. This enclosure is protected from the remainder of the condenser structure by the sweep of the steam issuing along the paths indicated by the arrows F from the de-gassing stages "B" and "C". The roof 10 also covers and prevents any water issuing from stage C from coming into contact with steam rich in non-condensing substances such as oxygen and which would therefor tend to re-gasify it.

The oxygen concentration within the enclosure of tank 17 provided by roof 10 may be made virtually zero even if the partial pressure of the non-condensing substances at the level of the condenser tube bundle 18 should be high. In certain operational conditions, computations show that a partial pressure of non-condensing substances may exceed by 30 percent that within the condenser structure at the level of the tube bundle 18.

The overall bulk of the de-gassing apparatus requires about 20 percent of the space required for the reserve tank 17.

The condensate and different drainages passing through the condenser are all collected on the roof 10 causing them to flow towards the successive de-gassing stages and no condensate or drainage may reach tank 17 without first passing through the de-gassing devices. The output of the de-gassing steam must be approximately 0.5 percent of the output of the water to be treated in each of the de-gassing stages B and C.

The extraction pumps which apply suction to the reserve tank 17 to draw water therefrom must of course be provided with sufficient water to prevent any possibility of creating any cavitation effect therein.

The de-gassing apparatus in accordance with the invention will not perturb the water in reserve tank 17 since there is no injection of steam into it at a level below its surface. All steam entering the enclosure for this tank reaches it above the surface as indicated by the arrows F. Indeed, steam injection beneath the water level in tank 17 is to be purposely avoided for this would create adverse eddies affecting suction of the extraction pumps and would keep the water in a state of ebullition throughout its mass thus resulting in a load loss for the extraction pumps corresponding to the height of the water in the tank.

I claim:

1. A composite structure operating under a vacuum for condensing steam discharged from a turbine unit of a thermal power plant and de-gassing the condensate prior to feeding the condensate back to the boiler for re-cycling which comprises a casing having an inlet for the steam, a cooling tube bundle across which the steam passes in heat exchange relation therewith to effect its condensation and a three-stage de-gasifier for treating the condensate to remove non-condensables such as oxygen therefrom, said first stage being established by means injecting steam issuing from the subsequent stages into condensate flowing over a downwardly sloping roof located below the cooling tube bundle thereby to atomize the condensate, said second stage being established by means injecting steam into a first tank filled with the condensate falling from said roof thereby to effect a bubbling action in the condensate, and said third stage being established by means injecting steam into a layer of the condensate flowing across a weir from said first tank into a second tank to effect atomization thereof.

2. A composite condenser and de-gasifier structure as defined in claim 1 wherein said roof covers said second tank thereby to prevent condensate from reaching it directly from said cooling tube bundle.

3. A composite condenser and de-gasifier structure as defined in claim 1 wherein said first tank consists of two compartments located in side-by-side relation, the condensate flowing into and downwardly through one of said compartments as it leaves said roof and thence upwardly through the other compartment to reach said weir from which the overflow condensate discharges into said second tank, and wherein said means injecting steam into said first tank is located near the bottom thereof.

4. A composite condenser and de-gasifier structure as defined in claim 1 wherein said means for injecting steam into the layer of condensate flowing across said weir is constituted by a slit structure located beneath it and through which the steam issues.

5. A composite condenser and de-gasifier structure as defined in claim 1 wherein said roof slopes upwardly from both sides and includes outlets at each side constituting means by which steam issuing from the second and third stages is injected into the condensate as it flows downwardly over the roof.

6. A composite condenser and de-gasifier structure as defined in claim 5 and which includes a further outlet located below said roof constituting means by which steam issuing from said second and third stages is injected into the condensate as it discharges from the edge of the roof.

* * * * *